(12) United States Patent
Walsh et al.

(10) Patent No.: US 7,231,410 B1
(45) Date of Patent: Jun. 12, 2007

(54) REVISION CONTROL SYSTEM FOR LARGE-SCALE SYSTEMS MANAGEMENT

(75) Inventors: Robert Walsh, Sunnyvale, CA (US); Bryan O'Sullivan, Burlingame, CA (US)

(73) Assignee: Qlogic, Corporation, Aliso Viejo, CA (US)

( * ) Notice: Subject to any disclaimer, the term of this patent is extended or adjusted under 35 U.S.C. 154(b) by 473 days.

(21) Appl. No.: 10/797,977

(22) Filed: Mar. 10, 2004

(51) Int. Cl.
*G06F 17/30* (2006.01)

(52) U.S. Cl. ...................... 707/203; 707/200

(58) Field of Classification Search ............. 707/1–205
See application file for complete search history.

(56) References Cited

U.S. PATENT DOCUMENTS 5,787,444 A * 7/1998 Gerken et al. ............... 707/203
5,805,889 A * 9/1998 Van De Vanter ............ 717/107
5,930,798 A * 7/1999 Lawler et al. ............... 707/102

OTHER PUBLICATIONS

"BitKeeper The Scalable Distributed Software Configuration Management System," BitKeeper Source Management, http://web.archive.org/web/20031202014928/bitkeeper.com/Sales.BitKeeper.html, 1997-2002, BitMover. Inc., 3 pgs.
"A Compelling Replacement for CVS", http://subversion.tigris.org, Subversion, 3 pgs.
"The Perforce SCM System, Perforce Product Information", http://web.archive.org/web/200402020273819/www.perforce.com/perforce/products.html, Release 2003.2, 1996, 2003, Perforce, 2 pgs.

* cited by examiner

*Primary Examiner*—Cheryl Lewis

(57) ABSTRACT

A repository manager facilitates robust revision control of components of a large scale system. The repository manager stores system components under revision control in a repository, according to internal names. The repository manager also stores binding information between internal names of system components and associated external names, as well as component attribute information. The repository manager provides users with working areas, from which they are able to access system components according to their external names, via the repository manager. As users perform operations affecting system components, the repository manager keeps track of the performed operations. Responsive to a user committing a set of changes, the repository manager updates the master repository according to the performed operations, associates a new version number with the resulting state of the repository and synchronizes the user's working area with the updated repository.

28 Claims, 3 Drawing Sheets

| file name | operation | user | working area | arguments | comment | committed |
|---|---|---|---|---|---|---|
| a.txt | add | user1 | /wa1 | | 6s pack | yes |
| b.txt | add | user1 | /wa1 | | 6s pack | yes |
| a.txt | edit | usera | /wa a | | 1.1 update | no |
| b.txt | edit | usera | /wa a | | 1.1 update | no |
| c.txt | add | usera | /wa a | | 1.1 update | no |

FIG. 3

REVISION CONTROL SYSTEM FOR LARGE-SCALE SYSTEMS MANAGEMENT

BACKGROUND

1. Field of Invention

The present invention relates generally to large-scale systems management, and more specifically to facilitating robust revision control of components of a large scale system.

2. Background of Invention

Keeping track of multiple revisions to frequently changing computer configurations is a challenge facing system administrators and others responsible for maintaining large scale systems. Because of the number of files and other components involved in a large scale system, installing new software, upgrading existing software or modifying the configuration of the installed software can cause subtle changes in many of the configuration files which can go unnoticed. These changes to configuration files can then cause system problems that might not be noticed immediately. Thus, various nodes of a large scale system can end up with varying and possibly problematic configuration files which can be difficult to identify.

Additionally, where multiple users make frequent updates to the configuration, it can be very difficult to ensure that each user has the latest version of each system component. Users without current components are often unable to properly interact with the system. Furthermore, these users might subsequently make changes to old versions of components and propagate these changes to other users.

Changes to system configurations can involve much more than file modifications. Directories can be added or updated, hierarchies can be modified and file and directory ownership, group and permission information can be changed. Additionally, existing files and directories can be renamed or deleted.

What is needed are methods, systems and computer readable media to enable robust revision control of a system configuration, including directories, file and directory ownership, group and permission information. The methods, systems and computer readable media should also maintain revision history information across file and directory rename or delete operations.

SUMMARY OF INVENTION

Methods, systems and computer readable media facilitate robust revision control of components of a large scale system. A repository manager stores a plurality of system components under revision control in a master repository, according to internal names. The repository manager also stores binding information between internal names of system components and associated external names, as well as system component attribute information. The repository manager provides users with working areas, which can be synchronized with the master repository. Users are only able to access system components from working areas, according to their external names, via the repository manager. As users perform operations affecting system components, the repository manager keeps track of the performed operations in a journal in the master repository. Responsive to a user committing a set of changes, the repository manager updates the master repository according to the performed operations as recorded in the journal, associates a new version number with the resulting state of the repository such that the change-set can be backed out, updates the journal to indicate that the operations have been committed to the repository, and synchronizes the user's working area with the updated repository.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 3 is a block diagram illustrating an example of a section of a journal, according to one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
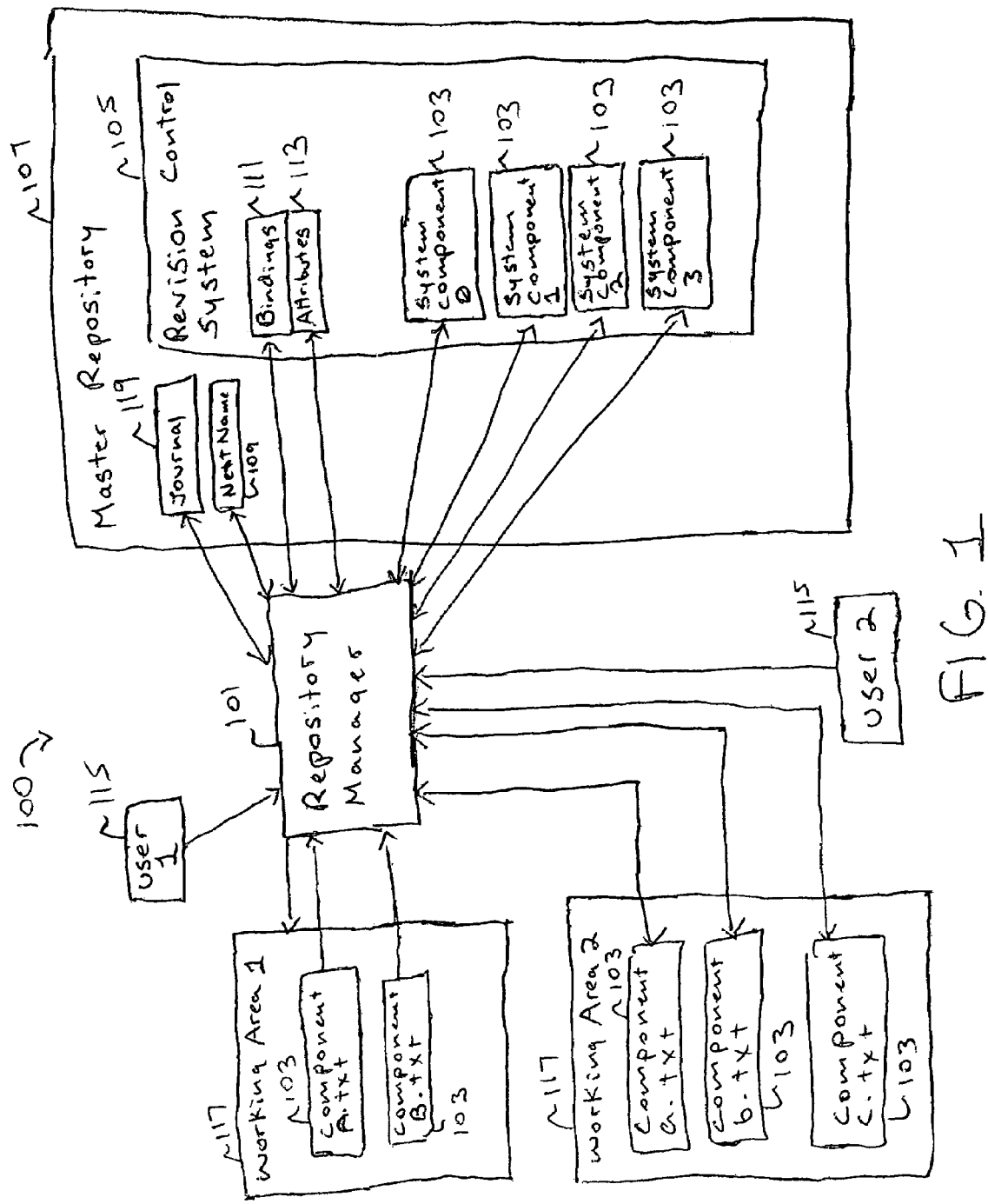
FIG. 1 is a block diagram illustrating a system 100 for practicing some embodiments of the present invention.

FIG. 1 illustrates a system 100 for practicing some embodiments of the present invention. A repository manager 101 stores system components 103 (e.g., symbolic links, files, directories) in a revision control system 105 in a master repository 107, according to internal names. It is to be understood that although the repository manager 101 is illustrated as a single entity, as the term is used herein a repository manager 101 refers to a collection of functionalities which can be implemented as software, hardware, firmware or any combination of the three. Where a repository manager 101 is implemented as software, it can be implemented as a standalone program, but can also be implemented in other ways, for example as part of a larger program, as a plurality of separate programs, or as one or more statically or dynamically linked libraries.

An internal name of a system component 103 is a constant descriptor used within the master repository 107 to denote the component 103, even as it is modified over time. An external name is typically the name of the component 103 in the external file system (for example, "/etc/ntp.conf"), and can change as the component 103 is modified. For example, the file /etc/ntp.conf can be renamed, but the corresponding internal name would not be changed. In one embodiment, the internal names used to describe the system components 103 stored in the revision control system 105 are sequential numbers, such that the first system component 103 stored is assigned the internal name 0 (or some other number such as 1), and each subsequent system component 103 is assigned an incremented number. Of course, variations on the internal naming schemes are possible (e.g., the numbers can be decremented as additional system components 103 are added to the revision control system 105), all of which are within the scope of the present invention. Various internal naming formats will be apparent to those of ordinary skill in the relevant art in light of this specification.

In some embodiments, a next name indicator 109 is stored in the master repository 107. The next name indicator 109 can be, for example, a file containing the next available internal name (e.g., the next available sequential number). As system components 103 are added, the repository manager 101 reads the next name indicator 109, assigns the next available name to the system component 103 being added, and updates the next name indicator 109 accordingly.

It is to be understood that the stored system components 103 can comprise or describe the configuration of a large scale system, for example a computer cluster. The implementation mechanics of storing data in a revision control system 105 is known to those of ordinary skill in the relevant art, and thus the methodology for storing system components 103 will be apparent in light of this specification.

The repository manager 101 also stores, under revision control 105 in the master repository 107, a binding 111 between the internal name of each system component 103 and its external name, as well as attributes 113 concerning system components 103. An attribute 113 can be any relevant data concerning a component 103, for example group or owner information concerning the component 103, the component 103 type, a version number, a mode, security settings or access permission data, or an indication that the component 103 has been deleted. Components 103 and their attributes 113 are discussed in greater detail below.

Figure 2:
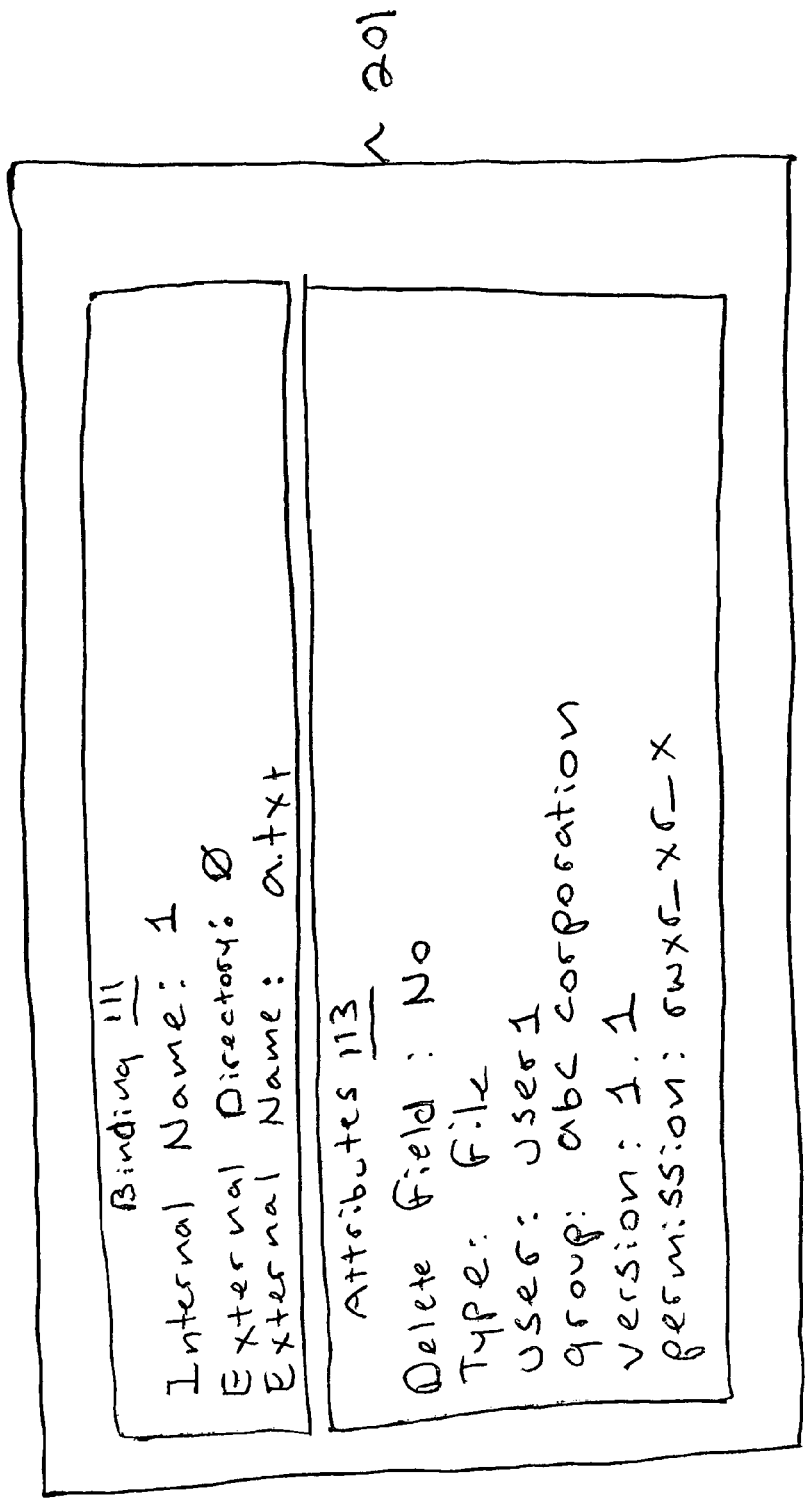
FIG. 2 is a block diagram illustrating an example of a data record in a file storing both bindings and attributes concerning system components, according to one embodiment of the present invention.

Typically, the bindings 111 between internal and external names as well as the attributes concerning components 103 are stored in a single file under revision control 105 in the master repository 107. An example of such a file is illustrated in FIG. 2, and described further below.

As illustrated in FIG. 1, users 115 can perform operations on system components 103. It is to be understood that a user 115 can be anyone accessing components 103 of the large scale system in question, for example administrators responsible for various parts of the system (e.g., individual nodes in a cluster system). The repository manager 101 provides a user 115 with a working area 117, which acts as a working copy of the master repository 107 with a copy of binding 111 and attribute 113 information, in which the user 115 can perform operations on system components 103, according to their external names. The repository manager 101 does not allow users 115 direct access to the master repository 107, but instead only allows users 115 to access system components 103 by their external names in a working area 117, via the repository manager 101. Specific operations that can be performed by users 115 and the relevance of performing such operations is discussed in greater detail below.

The repository manager 101 also stores, in the master repository 107, a journal 119 of operations performed on system components 103 by users 115. When a user 115 performs an operation on a system component 103 according to its external name, the repository manager 101 updates the journal 119 accordingly. For example, suppose a first user 115 operating in a first working area 117 installs a new software package, which creates various new directories and populates them with specific new files. The repository manager 101 will update the journal to indicate that the specific user 115 has added these system components 103. It is to be understood that the journal 119 resides in the master repository 107, is not copied to user 115 working areas 117, and is accessed directly only by the repository manager 101.

Once the user 115 has completed making a set of changes (in the above example, installing the software package), the user commits the change-set to the master repository 107. To do so, the user 115 makes an appropriate indication to the repository manager 101, and in response the repository manager 101 reads the journal 119 and updates the revision control system 105 to reflect the set of changes made by the user 115. In the above example, the repository manager 101 would read the journal 119 and determine that the specific user 115 added a set of system components 103. Thus, the repository manager 101 would obtain an internal name for each new system component 103, and check it into the revision control system 105 under its internal name. The revision control system would update the bindings 111 to associate the internal names with their corresponding external names, and store appropriate attributes 113 concerning the new system components 103. The repository manager would also update the journal 119 to reflect that the user indication has been processed, and associate a new version number with the current state of the revision control system 105 (including the current state of the bindings 111 and attributes 113). In other words, the state of the revision control system is associated with a new version number after each set of user changes is processed, such that the state of the associated system before and after the change set (in this example, before and after the software package is installed) can be recreated from the revision control system 105. Once a change-set has been processed, the repository manager 101 updates the user's 115 working area 117 to synchronize it with the master repository 107, providing an updated copy of the binding 111 and attribute 113 information.

As another example, suppose a second user 115, operating from a second working area 117, updates the software package previously installed by the first user, such that various existing system components 103 are modified. For example, the updating of the software package could result in various existing files being edited, renamed, deleted and moved to different locations. As these operations are performed by the second user 115 from the second working area 117, the repository manager 101 will update the journal 119 accordingly. Responsive to the indication from the second user 115 that the change set is complete, the repository manager 101 will read the journal 119 to determine which operations have been performed by the user 115 on which system components 103. The repository manager 101 reads the bindings 111 to determine the internal names of affected system components 103, updates the revision control system 105 to reflect the updates, and associates a new version number with the updated state of the revision control system 105.

It is to be understood that the specific format of the journal 119 can vary from embodiment to embodiment. One specific example is illustrated by FIG. 3 and described in greater detail below. Other representation formats will be apparent to those of ordinary skill in the relevant art in light of this specification, and are within the scope of the present invention. It is also to be understood that communication between a user 115 and the repository manager 101 can be via the user 115 executing a command on a command line, via the 115 user operating a graphical user or other type of interface, or by a process owned by the user 115 making an appropriate call to an application program interface.

FIG. 2 illustrates an example of a data record 201 in a file storing both bindings 111 and attributes 113 concerning system components 103, according to an embodiment of the present invention. As explained above, bindings 111 and attributes 113 need not but can be stored in the same file. For purposes of visual clarity, FIG. 2 illustrates an example of one possible format for storing information concerning one component 103. Of course, typically bindings 111 and attributes 113 concerning many components 103 would be stored.

The illustrated binding 111 associated internal name "1" with the external variable character string (in this case, a file name "a.txt" and a directory, 0). Note that the external directory is stored as an internal name ("0"), indicating that the directory in which the file a.txt is stored is itself a component 103 in the repository 107, with an associated internal name. In some embodiments, the entire string "/0/a.txt" is stored in a single field, called, for example, external name.

As the corresponding system component 103 a.txt is modified, renamed, moved and even deleted (and/or undeleted) by users 115, its external name will change, but the internal name "1" will always be used to denote the component 103 in the revision control system 105 in the master repository 107. Additionally, the directory in which a.txt resides can be moved, renamed, etc. and its own internal name of 0 will remain constant. When an external name has been changed by a user 115 performing an operation on a component 103, the repository manager 101 updates the appropriate stored binding 111 to reflect the change to the external name during the corresponding update of the revision control system 105 described above.

The stored attributes 113 illustrated in FIG. 2 comprise a delete field, indicating that the component 103 has not been deleted, the component type 103 (in this example, a file), the user that currently owns the component 103, the relevant group, the current component 103 version number, and the access permissions. These attributes of course change as users 113 perform operations of the corresponding system component 103. When a user 115 performed operation has modified a component's attributes, the repository manager 101 updates the stored attributes 113 accordingly during the relevant revision control system 105 update. The attributes illustrated in FIG. 2 are examples of possible attributes 113 concerning a system component 103. Of course, other examples are possible as desired.

FIG. 3 illustrates an example of a section of a journal 119, according to an embodiment of the present invention. It is to be understood that the actual journal 119 need not be stored in human readable format. FIG. 3 is intended simply to show types of data that can be stored in a journal, in conjunction with an explanation of their usages according to some embodiments of the present invention.

As illustrated in FIG. 3, the journal contains entries pertaining to user 115 operations affecting system components 103. In the embodiment illustrated in FIG. 3, the journal records, for each performed user 115 operation, the affected component 103, the specific performed operation, the name of the user 115 who performed the operation, the associated working area 117, any arguments that the operation takes in addition to the component name (e.g., the new mode or owner if the operation is a change mode or change owner command), an optionally user 115 supplied comment associated with the operation and an indication of whether the operation has been committed. Committing operations is discussed in greater detail below. In some embodiments, the journal has fewer fields (e.g., no comment field, no commit field), more fields (e.g., a field describing order dependency in which multiple operations must be performed) or differently ordered or named fields, as desired.

It is to be understood that users 115 can perform a wide variety of operations on system components 103 in order to add, modify and/or delete system configurations as desired. For example, a user 112 can add system components 103 to the master repository 107, edit, rename, delete and undelete components 103, modify linking information concerning components 103, change group, mode or owner information concerning components, undo earlier performed user 115 operations and back change-sets out of the master repository 107.

Because user 115 operations are performed via the repository manager 101, the repository manger can update the journal 119 as the operations are performed. As described above, when a user has finished performing a set of operations (e.g., installing or modifying system components 103), the user 115 commits the change-set by sending an appropriate indication to the repository manager 107, which reads the journal 119 and updates the revision control system 105 according to that user's 115 uncommitted operations as documented in the journal 119. The repository manager 101 then updates the journal 119 to indicate that the operations have been committed, and synchronizes the user's 115 working area 117 with the master repository 107. In some embodiments, the repository manager 101 updates the journal 119 to indicate that the operations have been committed by updating the appropriate commit fields in the journal 119. In other embodiments, the repository manager 101 updates the journal 119 to indicate that the operations have been committed by deleting the entries in the journal 119 relating to those operations.

Of course, all operations that modify a system component 103 require that a user 115 have the system component 103 checked out of the master repository 107 for editing, and the repository manager 101 enforces this. Thus, a user 115 cannot edit, delete, rename or otherwise perform modifying operations on components 103 which are not checked out to the user 115. When a user 115 performs, for example, an edit operation, the repository manager 101 checks out the target component 103 out of the master repository 107 for the user 115. When the user 115 commits the edit, the repository manager 101 checks the edited version of the component into the revision control system 105, in the master repository 107. The repository manager 101 does not allow a user 115 to edit a component 103 checked out for editing by another user 115.

Additionally, users 115 can request status information and the like from the repository manager 101. For example, a user 115 operating in a working area 117 can request and receive listings concerning change-sets entered into the revision control system 105 in the master repository 107, differences between two versions of a system component 103, information concerning system components 103, a listing of system components 103 currently checked out of the master repository 107 for editing and/or revision information concerning system components 103. Users 115 can also request and receive information concerning their working areas 117, such as the location of a working area 117 (e.g., its absolute path in the relevant file system, or its path relative to the master repository 107) or the path to the root of the master repository 107. Additionally, a user 115 can also request the synchronization of an associated working area 117 with the master repository 107.

As will be understood by those familiar with the art, the invention may be embodied in other specific forms without departing from the spirit or essential characteristics thereof. Likewise, the particular naming and division of the modules, features, attributes, methodologies and other aspects are not mandatory or significant, and the mechanisms that implement the invention or its features may have different names, divisions and/or formats. Furthermore, as will be apparent to one of ordinary skill in the relevant art, the modules, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for facilitating robust revision control of components of a system, the method comprising:
   storing a plurality of system components under revision control in a master repository, according to internal names;
   storing, under revision control in the master repository, a binding between the internal name of each of the plurality of system components and its corresponding external name;
   storing, under revision control in the master repository, attributes concerning system components;
   storing, in the master repository, a journal of operations performed on system components;
   responsive to a user performing an operation on at least one system component according to its external name, updating the journal accordingly;
   responsive to a user indication, updating the revision control system to include a new version of its contents reflecting a change-set of operations consisting of all operations performed by the user on system components since a previous indication, from the user;
   reading the journal to determine which operations have been performed by the user on system components since the previous indication from the user;
   determining the internal names of affected system components;
   updating affected system components in the revision control system according to the user performed operations;
   updating the journal to reflect processing of the user indication; and
   associating a new version number with a resulting state of the revision control system.

2. The method of claim 1 wherein updating the revision control system to include a new version of the system components further comprises:
   updating the stored bindings to reflect at least one change to at least one external name of at least one affected system component made by at least one user operation.

3. The method of claim 1 wherein updating the revision control system to include a new version of the system components further comprises:
   updating the stored attributes to reflect at least one change to at least one attribute concerning at least one affected system component made by at least one user operation.

4. The method of claim 1 wherein updating the revision control system to include a new version of the system components further comprises:
   modifying the affected system components in the master repository to reflect the performed user operations.

5. The method of claim 1 wherein storing a plurality of system components further comprises:
   storing at least one system component from a group of system components consisting of:
   a symbolic link;
   a file; and
   a directory.

6. The method of claim 1 wherein storing attributes concerning system components further comprises:
   storing at least one attribute concerning at least one system component from a group of attributes consisting of:
   a deletion indicator;
   an owner;
   a group;
   a type;
   a version number;
   a mode; and
   security settings.

7. The method of claim 1 further comprising:
   storing, in the master repository, a indication of a next available internal name; and
   updating the indication accordingly as internal names are assigned to system components.

8. The method of claim 1 further comprising:
   providing at least one user with a user working area, each user working area comprising a working copy of the master repository, in which a user can perform operations on system components; and
   only providing users access to system components in user working areas, according to their external names.

9. The method of claim 8 wherein storing a binding between the internal name a system component and its corresponding external name further comprises:
   storing a binding between a constant number used to refer to the system component in the revision control system and a variable character string used to refer the system component by at least one user, in at least one user working area.

10. The method of claim 8 wherein updating the revision control system to include a new version of the system components reflecting a change-set further comprises:
    synchronizing the user working area from which the user made the indication with the master repository.

11. The method of claim 8 wherein responsive to a user performing an operation on at least one system component according to its external name, updating the journal accordingly further comprises:
    updating the journal to indicate to indicate that the user has performed an operation on at least one system component from a group of operations consisting of:
    adding at least one system component to the master repository;
    backing a change-set out of the master repository;
    changing a group of at least one system component;
    changing a mode of at least one system component;
    changing an owner of at least one system component;
    adding a comment concerning at least one journal entry;
    editing at least one system component;
    modifying linking information concerning at least one system component;

deleting at least one system component from the master repository;
un-deleting at least one system component in the master repository;
renaming at least one system component; and
undoing at least one earlier performed user operation.

12. The method of claim 8 further comprising:
responsive to a request from a user in a working area, providing the user with data from a group of data consisting of:
at least one entered change-set;
differences between two versions of a system component;
information concerning at least one system component;
a location of the user's working area;
a listing of system components currently checked out for editing;
a requested revision of a system component; and
a path to a root of the master repository.

13. The method of claim 8 further comprising:
responsive to a user request, synchronizing the user working area from, which the user made the request with the master repository.

14. The method of claim 8 further comprising:
requiring a user to check a system component out of the master repository for editing before performing a modifying operation, on the system component.

15. A computer readable medium containing a computer program product for facilitating robust revision control of components of a system, the computer program product executed on a processor comprising:
program code for storing a plurality of system components under revision control in a master repository, according to internal names;
program code for storing, under revision control in the master repository, a binding between the internal name of each of the plurality of system components and its corresponding external name;
program code for storing, under revision control in the master repository, attributes concerning system components;
program code for storing, in the master repository, a journal of operations performed on system components;
program code for, responsive to a user performing an operation on at least one system component according to its external name, updating the journal accordingly;
program code for, responsive to a user indication, updating the revision control system to include a new version of its contents reflecting a change-set of operations consisting of all operations performed by the user on system components since a previous indication from the user;
program code for reading the journal to determine which operations have been performed by the user on system components since the previous indication form the user;
program code for determining the internal names of affected system components;
program code for updating affected system components in the revision control system according to the user performed operations:
program code for updating the journal to reflect processing of the user indication; and
program code for associating a new version number with a resulting state of the revision control system.

16. The computer program product of claim 15 wherein the program code for updating the revision control system to include a new version of the system components further comprises:
program code for updating the stored bindings to reflect at least one change to at least one external name of at least one affected system component made by at least one user operation.

17. The computer program product of claim 15 wherein the program code for updating the revision control system to include a new version of the system components further comprises:
program code for updating the stored attributes to reflect at least one change to at least one attribute concerning at least one affected system component made by at least one user operation.

18. The computer program product of claim 15 wherein the program code for updating the revision control system to include a new version of the system components further comprises:
program code for modifying the affected system components in the master repository to reflect the performed user operations.

19. The computer program product of claim 15 further comprising:
program code for providing at least one user with a user working area, each user working area comprising a working copy of the master repository, in which a user can perform operations on system components; and
program code for only providing users access to system components in user working areas, according to their external names.

20. The computer program product for claim 19 wherein the program code for updating the revision control system to include a new version of the system components reflecting a change-set further comprises:
program code for synchronizing the user working area from which the user made the indication, with the master repository.

21. The computer program product for claim 19 further comprising:
program code for requiring a user to check a system component out of the master repository for editing before performing a modifying operation on the system component.

22. A computer system for facilitating robust revision control of components of a system, the computer system comprising:
a software portion configured to store a plurality of system components under revision control in a master repository, according to internal names;
a software portion configured to store, under revision control in the master repository, a binding between the internal name of each of the plurality of system components and its corresponding external name:
a software portion configured to store, under revision control in the master repository, attributes concerning system components;
a software portion configured to store, in the master repository, a journal of operations performed on system components;
a software portion configured to, responsive to a user performing an operation on at least one system component according to its external name, update the journal accordingly; and
a software portion configured to, responsive to a user indication, update the revision control system to include a new version of its contents reflecting a change-set of operations consisting of all operations performed by the user on system components since a previous indication from the user;
a software portion configured to determine the internal names of affected system components;
a software portion configured to update affected system components in the revision control system according to the user performed operations;
a software portion configured to update the journal to reflect processing of the user indication; and
a software portion configured to associate a new version number with a resulting state of the revision control system.

23. The computer system of claim 22 wherein the software portion configured to update the revision control system to include a new version of the system components farther comprises:
a software portion configured to update the stored bindings to reflect at least one change to at least one external name of at least one affected system component made by at least one user operation.

24. The computer system of claim 22 wherein the software portion configured to update the revision control system to include a new version of the system components further comprises:
a software portion configured to update the stored attributes to reflect at least one change to at least one attribute concerning at least one affected system component made by at least one user operation.

25. The computer system of claim 22 wherein the software portion, configured to update the revision control system to include a new version of the system components further comprises:
a software portion configured to modify the affected system components in the master repository to reflect the performed user operations.

26. The computer system of claim 22 further comprising:
a software portion configured to provide at least one user with a user working area, each user working area comprising a working copy of the master repository, in which a user can perform operations on system components; and
a software portion configured to only provide users access to system components in user working areas, according to their external names.

27. The computer system of claim 26 wherein the software portion configured to update the revision control system to include a new version of the system components reflecting a change-set further comprises:
a software portion configured to synchronize the user working area from which the user made the indication with the master repository.

28. The computer system of claim 26 further comprising:
a software portion configured to require a user to check a system component out of the master repository for editing before performing a modifying operation on the system component.

* * * * *

UNITED STATES PATENT AND TRADEMARK OFFICE
CERTIFICATE OF CORRECTION

PATENT NO.        : 7,231,410 B1                                               Page 1 of 1
APPLICATION NO. : 10/797977
DATED             : June 12, 2007
INVENTOR(S)       : Robert Walsh et al.

It is certified that error appears in the above-identified patent and that said Letters Patent is hereby corrected as shown below:

In column 8, line 55, in claim 11, before "that" delete "to indicate".

In column 9, line 22, in claim 13, delete "from," and insert -- from --, therefor.

In column 9, line 27, in claim 14, delete "operation," and insert -- operation --, therefor.

In column 9, line 57, in claim 15, delete "form" and insert -- from --, therefor.

In column 10, line 38, in claim 20, delete "indication," and insert -- indication --, therefor.

In column 11, line 18, in claim 23, delete "farther" and insert -- further --, therefor.

Signed and Sealed this

Fifth Day of October, 2010

David J. Kappos
*Director of the United States Patent and Trademark Office*